United States Patent
Jeol et al.

(10) Patent No.: US 9,637,595 B2
(45) Date of Patent: May 2, 2017

(54) POLYAMIDE, PREPARATION PROCESS AND USES

(71) Applicant: RHODIA OPERATIONS, Paris (FR)

(72) Inventors: Stephane Jeol, Saint-Fons (FR); Floryan Decampo, Pittsburgh, PA (US); Peng Li, Shanghai (CN)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 14/758,657

(22) PCT Filed: Jan. 6, 2014

(86) PCT No.: PCT/CN2014/070160
§ 371 (c)(1),
(2) Date: Jun. 30, 2015

(87) PCT Pub. No.: WO2014/106485
PCT Pub. Date: Jul. 10, 2014

(65) Prior Publication Data
US 2015/0337083 A1    Nov. 26, 2015

(30) Foreign Application Priority Data

Jan. 7, 2013   (WO) ................ PCT/CN2013/070150

(51) Int. Cl.
| | |
|---|---|
| *C08L 77/00* | (2006.01) |
| *D21H 17/55* | (2006.01) |
| *C08G 69/40* | (2006.01) |
| *C08J 5/00* | (2006.01) |
| *C08G 69/08* | (2006.01) |
| *C08G 69/14* | (2006.01) |
| *C08L 77/02* | (2006.01) |
| *C08G 69/16* | (2006.01) |
| *C08G 69/36* | (2006.01) |

(52) U.S. Cl.
CPC ............ *C08G 69/40* (2013.01); *C08G 69/08* (2013.01); *C08G 69/14* (2013.01); *C08G 69/16* (2013.01); *C08G 69/36* (2013.01); *C08J 5/00* (2013.01); *C08L 77/02* (2013.01); *C08J 2377/02* (2013.01)

(58) Field of Classification Search
None
See application file for complete search history.

(56) References Cited

U.S. PATENT DOCUMENTS 2,808,392 A   10/1957   Hachihama et al.

FOREIGN PATENT DOCUMENTS

CN   102311546 A   1/2011

OTHER PUBLICATIONS

Hachiama et al. (Makromolekulare Chemie vol. 17 pp. 43-55 (1955)).*
Moore et al.—"Ion-binding Properties of Poly(iminomethylene-cis-(tetrahydro-2,5-furandiyl)-carbonyl) and Poly(oxymethylene-cis-(tetrahydro-2,5-furandiyl)carbonyl)", (1983), Macromolecules, 16, 338 (2 pages).
Chakraborty et al.—"Cyclic Homooligomers of Furanoid Sugar Amino Acids", (2003) Org. Chem., vol. 16, No. 68, 6257-6263 (7 pages).
Moore et al.—"Synthesis of an Ion-Binding Polyester and Polyamide Containing THF-Rings", (1982) 183rd ACS National Meeting, Las Vegas, NV, Polymer Prep., 23(1), pp. 166-167 (2 pages).
Moore et al.—"Synthesis and Polymerization of 2-Oxo-3, 8-dioxabicyclo[3.2.1]Octane", (1975) J. Polym. Sci., Polym. Lett. Ed., 13, 333 (3 pages).
Gandini—"Polymers from Renewable Resources: A Challenge for the Future of Macromolecular Materials" (2008) Macromolecules, vol. 34 (24) 9491-9504 (14 pages).
Schrey et al.—"Synthesis and Functional Studies of a Membrane-Bound THF-Gramicidin Cation Channel" (2000) Agnew. Chem. Int. Ed. 39 (5) 900-902 (3 pages).
Walker et al.—"Synthesis of (±) -8-Oxa-3-azabicyclo[3.2.1]octan-2-thione and (±)-2-Oxa-5-azabicyclo[2.2.1]heptan-6-thione: Potential Synthons for the Preparation of Novel Heteroaryl-Annulated Bicyclic Morpholines" (2011) Synthesis No. 7, pp. 1113-1119 (7 pages).
Moreau et al.—"Recent catalytic advances in the chemistry of substituted furans from carbohydrates and in the ensuing polymers" (2004) Topics in Catalysis, vol. 27, Nos. 1-4, pp. 11-30 (20 pages).

* cited by examiner

*Primary Examiner* — Susannah Chung
*Assistant Examiner* — Robert T Butcher

(57) ABSTRACT

The present invention relates to a novel polyamide synthesized from biobased monomers. The novel polyamide comprises the repeat unit of following formula (I). The present invention also relates to the process for the preparation of said polyamide, to its uses and to articles and compositions comprising said polyamide.

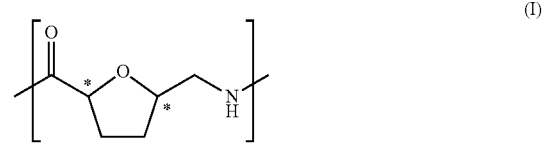

(I)

14 Claims, No Drawings

POLYAMIDE, PREPARATION PROCESS AND USES

This application is a U.S. national phase entry under 35 U.S.C. §371 of International Application No. PCT/CN2014/070160, filed on Jan. 6, 2014, which claims priority to International Application No. PCT/CN2013/070150, filed on Jan. 7, 2013. The entire contents of these applications are explicitly incorporated herein by this reference.

The present invention relates to a novel polyamide, to its process of preparation and to its uses. The invention more particularly relates to a polyamide synthesized from biobased monomers.

The term "biobased" is understood to mean that it concerns a material derived from renewable resources. A renewable resource is a natural—animal or plant—resource, the stock of which can be reconstituted over a short period on the human scale. It is in particular necessary for this stock to be able to be renewed as quickly as it is consumed.

Unlike materials resulting from fossil materials, renewable starting materials contain a high proportion of $^{14}C$. This characteristic can in particular be determined via one of the methods described in standard ASTM D6866, in particular according to the mass spectrometry method or the liquid scintillation spectrometry method.

These renewable resources are generally produced from cultivated or non-cultivated plant matter, such as trees, plants, for example sugarcane, corn, cassava, wheat, rape, sunflower, palm, castor oil plant or the like, or from animal matter, such as fats (tallow, and the like).

Polymers synthesized from biobased monomers are of major interest nowadays since they make it possible to reduce the environmental footprint. There are a large number of combinations of biobased monomers or of combinations of biobased monomers and of monomers resulting from fossil resources which can be used to generate polymers, which are then said to be "biobased". Some of these biobased polymers can be used to replace polymers resulting from fossil resources. This is the case, for example, for polyamide PA 6.10, synthesized from hexamethylenediamine (fossil resource) and from biobased sebacic acid resulting from castor oil, which can replace PA 12 (resulting from fossil resources), in particular in motor vehicle applications.

Among biobased monomers, great interest is being displayed in furans, in particular furfural (F), itself obtained, for example, from $C_5$ sugars, such as xylose, as described in the paper *Macromolecules*, Vol. 41, No. 24, 2008, pp. 9499-9500.

Semi-crystalline polyamides, such as PA 66, PA 6, PA 11, PA 12 or PA 46, or polyphthalamides PA 6T/66, PA 6T/MT and PA 6T/6I, PA 10T or PA 9T are industrial polymers which are widely used in applications such as motor vehicles, textiles or in the electrical and electronics (E&E) sector. They constitute the vast majority of the polyamides sold worldwide. Amorphous polyamides are, for their part, more marginal since the amorphous nature often limits the application performances and the working temperature range.

Polyamides have also been synthesized from furan compounds, such as biobased monomers, in particular from furamide and formaldehyde in an acidic medium, as described in the paper by C. Moreau et al., "Recent catalytic advances in the chemistry of substituted furans from carbohydrates and in the ensuing polymers", *Topic in Catalysis*, Vol. 27, Nos. 1-4, February 2004, pp. 20-21. However, it appears that this type of polyamide has to be synthesized using the reactant formaldehyde, which is highly dangerous to the health, in particular carcinogenic, which requires severe handling constraints in producing polymers on the large-scale. In addition, it is known that monomers comprising a carboxylic acid group bonded to a furan ring are capable of decomposing under the effect of the temperature, in particular by a decarboxylation reaction, which can result in the formation of furan, a compound also harmful to the health. This decomposition can occur during the synthesis of the polymer or also during the use thereof. Furthermore, side reactions between the amine functional groups and the double bonds of the furan rings can limit the quality of the polyamides formed.

These characteristics represent a curb on the development of polyamides from furan compounds, which thus cannot replace the polyamides resulting from fossil resources.

There thus still exists a need to provide novel polyamides, preferably semi-crystalline polyamides, resulting from biobased molecules, which make it possible to replace the polyamides resulting from fossil resources.

Furthermore, in the textile application, woven or knitted polyamide articles should confer maximum comfort on their users and ideally their appearance should resemble that of cotton or wool. This characteristic can be achieved by improving the hydrophilic nature of the polyamides. There thus also exists a need to provide novel polyamides resulting from biobased molecules exhibiting a hydrophilic nature.

Furthermore, there also exists a need to find a synthetic route to these biobased polyamides which is simple, clean and reproducible and which advantageously uses the industrial equipment already in place for conventional polyamides, such as polyamide 6 or 66. Furthermore, the manufacturing process which makes it possible to synthesize these polyamides should advantageously make it possible to achieve high molar masses.

In this context, it has been discovered, entirely surprisingly, that compounds of amino acid, amino ester or lactam type containing a tetrahydrofuran ring make it possible to synthesize novel polyamides with properties which are particularly advantageous in the usual applications of polyamides. These compounds, which are advantageously biosourced, can be obtained in particular from methyl 2-furoate (CAS: 611-13-2), of following expanded formula:

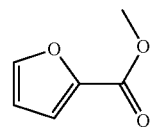

A subject matter of the invention is thus a novel polyamide comprising the repeat unit of following formula I (denoted THF):

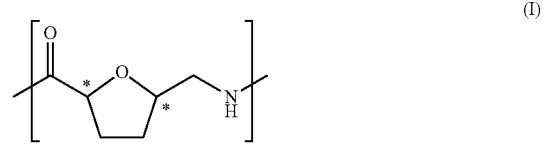

Within the meaning of the present invention, the symbol * means that the carbon is asymmetric.

Another subject matter of the invention is a process for the preparation of the polyamide of the invention, which comprises a polycondensation reaction between at least two identical or different monomers corresponding to the following formula II or to the following formula III:

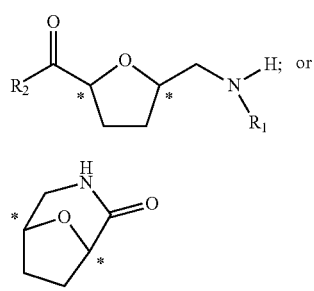

(II)

(III)

with
R₁ is a hydrogen atom or a group of formula —C(=O)R' with R' being an alkyl group having from 1 to 4 carbon atoms,
R₂ is a chlorine atom or a group of formula —OR" with R" being a hydrogen atom or a hydrocarbon group, R" being an alkyl group having from 1 to 4 carbon atoms.

Furthermore, a subject matter of the invention is the use of the polyamide of the invention for the preparation of articles by molding, injection molding, injection/blow-molding, extrusion/blow-molding, extrusion or spinning. The present invention is thus also targeted at articles obtained from the polyamide according to the invention, it being possible for said articles to take the form of molded or extruded parts, yarns, fibers, filaments or films.

The articles thus obtained have applications in numerous fields, such as industrial plastics (motor vehicle, E&E, consumer goods, and the like), industrial yarns, the textile industry, packaging, and the like.

The present invention also relates to compositions comprising at least the polyamide of the invention and optionally reinforcing fillers and/or various additives.

According to a preferred embodiment of the invention, the polyamide of the invention has a true number-average molar mass Mn of between 500 and 100 000 g/mol, preferably between 5000 and 50 000 g/mol and more preferentially still between 10 000 and 30 000 g/mol.

The true number-average molar masses are determined by various known methods, such as gel permeation chromatography. The term "true number-average molar masses" should be understood as meaning that they are not measurements as polystyrene equivalents.

According to a first advantageous embodiment, the polyamide according to the invention predominantly comprises the repeat unit of formula I. This repeat unit of formula I advantageously results from the polycondensation reaction between at least two identical or different monomers of formulae II and III as defined above.

The term "predominantly" is understood to mean that the polyamide can be a homopolyamide consisting entirely (100%) of the repeat unit of formula I but also that it can be a copolymer comprising other repeat units different from the unit of formula I, it being possible for these repeat units to result from comonomers, such as dicarboxylic acids, diamines, other amino acids, other amino esters and/or other lactams. These comonomers can represent up to 50 mol %, preferably up to 30 mol % and more preferentially still up to 15 mol % of the total amount of monomers introduced for the preparation of the polyamide of the invention.

According to a second advantageous embodiment, the polyamide according to the invention comprises as minor component the repeat unit of formula I. This repeat unit of formula I advantageously results from the polycondensation reaction between at least two identical or different monomers of formulae II and III as defined above.

The term "as minor component" is understood to mean that the polyamide is a copolymer comprising other repeat units different from the unit of formula I, it being possible for these repeat units to result from the polycondensation of monomers such as dicarboxylic acids, diamines, other amino acids, other amino esters and/or other lactams. These other monomers can then represent up to 99 mol %, preferably up to 70 mol %, of the total amount of monomers introduced for the preparation of the polyamide of the invention. In other words, the precursor monomers of the repeat unit of formula I can then represent at least 1 mol %, preferably at least 30 mol %, of the total amount of monomers introduced for the preparation of the polyamide of the invention. It is also perfectly possible that the precursor monomers of the repeat unit of formula I can represent between 0.5 to 10 mol %, preferably 1 to 7 mol %, of the total amount of monomers introduced for the preparation of the copolymer, for instance copolyamide.

The present invention notably concerns then a copolymer comprising at least the repeat unit of formula I and at least another repeat unit, different from the unit of formula I, resulting from the polycondensation of monomer; said monomer is notably chosen in the group consisting of:
dicarboxylic acids, such as aliphatic, cycloaliphatic or aromatic dicarboxylic acids notably comprising from 4 to 22 carbon atoms, such as for instance succinic acid, glutaric acid, adipic acid, suberic acid, azelaic acid, sebacic acid, 1,12-dodecanedioic acid; 1,3- or 1,4-cyclohexanedicarboxylic acid (cis/trans, or cis or trans); 1,3- or 1,4-phenylenediacetic acid; 1,3- or 1,4-cyclohexanediacetic acid; isophthalic acid; 5- -hydroxyisophthalic acid; terephthalic acid; 4,4'-benzophenonedicarboxylic acid; 2,6-naphthalenedicarboxylic acid; 2,5-tetrahydrofurandicarboxylic acid (cis/trans, or cis or trans) and 5-(t-butyl)isophthalic acid, alkali metal (Li, Na or K) salts of 5-sulfoisophthalic acid, and the C36 fatty acid dimers known under the Pripol name;
diamines, such as aliphatic, cycloaliphatic or aromatic diamines notably comprising from 4 to 22 carbon atoms, such as for instance hexamethylenediamine; 1,4-diaminobutane; 1,5-diaminopentane; 2-methyl-1,5-diaminopentane; 2-methylhexamethylenediamine; 3-methylhexamethylenediamine; 2,5-dimethylhexamethylenediamine; 2,2-dimethylpentamethylenediamine; 1,7-diaminoheptane; 1,8-diaminooctane; 1,9-diaminononanediamine; 2-methyl-1,8-octanediamine; 5-methylnonanediamine; 1,10-diaminodecane; 1,11-diaminoundecane; 1,12-diaminododecane; 2,2,4- and 2,4,4-trimethylhexamethylenediamine; 2,2,7,7-tetramethyloctamethylenediamine; meta-xylylenediamine; para-xylylenediamine; isophoronediamine; 4,4'-diaminodiphenylmethane; 4,4'-methylenebis(cyclohexylamine); C2-C16 aliphatic diamines which can be substituted with one or more alkyl groups; the C36 diamines originating from fatty acid dimers known under the Priamine name; 2,5-bis(aminomethyl)furan and 2,5-bis(aminomethyl)tetrahydrofuran (cis/trans, or cis or trans); para-phenylenediamine; meta-phenylenediamine; and the ethoxylated diamines known under the Jeffamine or Elastamine name (polyetherdiamine comprising ethylene glycol and/or propylene glycol and/or tetramethylene glycol ethers);

other amino acids or lactams, notably comprising from 4 to 22 carbon atoms, such as for example caprolactam, 6-aminohexanoic acid, 5-aminopentanoic acid, 7-aminoheptanoic acid, 9-aminononanoic acid, 11-aminoundecanoic acid or dodecanolactam; and other amino esters, notably comprising from 4 to 22 carbon atoms, such as methyl 6-aminohexanoate, methyl 11-aminoundecanoate, and methyl 12-aminododecanoate.

Preferably, said copolymer comprising at least the repeat unit of formula I and at least another repeat unit, different from the unit of formula I, resulting from the polycondensation of monomer, provide 0.5 to 10 mol %, preferably 1 to 7 mol % of repeat unit of formula I, calculated on the total amount of monomers introduced for the preparation of the copolymer.

Said copolymer can, for example, be:

PA THF/6 (synthesized from caprolactam and from the monomer of formula II, notably with $R_1$=H and $R_2$=OH, or formula III), PA THF/11 (synthetized from 11-aminoundecanoic acid and from the monomer of formula II, notably with $R_1$=H and $R_2$=OH, or formula III)

PA THF/12 (synthetized from dodecanolactam and from the monomer of formula II, notably with $R_1$=H and $R_2$=OH, or formula III)

PA THF/66 (synthesized from the monomer of formula II, notably with $R_1$=H and $R_2$=OH, or formula III and from Nylon salt, notably composed of a stoichiometric amount of adipic acid and of hexamethylenediamine), notably in the proportions described above PA THF/66/6 (synthetized from caprolactam, Nylon salt, notably composed of a stoichiometric amount of adipic acid and of hexamethylenediamine and from the monomer of formula II, notably with $R_1$=H and $R_2$=OH, notably or formula III).

The monomers of formula II or III can be the cis or trans stereoisomers or a mixture thereof. Preferably, the trans stereoisomer will be chosen. For the cis stereoisomer, the chiral carbons in the 2 and 5 positions can be R,S or S,R or a meso mixture. For the trans stereoisomer, the chiral carbons in positions 2 and 5 may be S,S or R,R or the racemic mixture. The two asymmetric carbons (denoted *) of the molecule can thus give rise to (2S,5S), (2S,5R), (2R,5R) and (2R,5S) configurations.

These monomers are particularly advantageous as they can confer a hydrophilic nature on the polyamides of the invention.

According to an advantageous embodiment of the invention, in the formula II, $R_1$ is a hydrogen atom and $R_2$ is an —OR" group with R" being a hydrogen atom.

According to another advantageous embodiment, in the formula II, $R_1$ is a hydrogen atom and $R_2$ is an —OR" group with R" being a linear or branched alkyl group comprising from 1 to 4 carbon atoms; preferably, R" is chosen from the following groups: methyl, ethyl, propyl, isopropyl, butyl and isobutyl.

Preferably, at least one of the monomers of formula II or III is biobased according to the standard ASTM D6866.

In the case where $R_1$ is a hydrogen atom, the amine can be stabilized by salifying it, for example with hydrochloric acid.

The monomers of formula II or III, which are advantageously biobased, can be synthesized, for example, as described by Walker et al. in the journal SYNTHESIS, 2011, No. 7, pp. 1113-1119.

For example, methyl 5-(azidomethyl)-2-furoate is prepared by reaction of its chlorinated homolog, methyl 5-(chloromethyl)-2-furoate, with an azide salt, such as sodium or tetrabutylammonium azide. The tetrahydrofuroate compound comprising a protective group on the amine functional group (for example, tert-butoxycarbonylamino) can then be obtained by reduction in the presence of hydrogen and of a metal catalyst (Pd, Rh, and the like).

The amino ester or lactam (8-oxa-3-azabicyclo[3.2.1]octan-2-one) compounds can then be obtained by deprotection of the amine functional group, typically by acid treatment.

The amino acid compound can then be obtained by hydrolysis of the ester functional group by acid or basic treatment.

The amino acid chloride can be obtained by treatment of the protected amino acid with a chlorinating agent, such as thionyl chloride, for example, followed by a stage of deprotection of the amine functional group.

The corresponding salts of the amine products mentioned above can be easily obtained by treatment with the corresponding acids.

According to a specific embodiment of the invention, at least one of the monomers of formula II is in the form of a salt. It will be understood, within the meaning of the present invention, that it can be:

an alkali metal or alkaline earth metal carboxylate when $R_2$ is —OR" with R" being a hydrogen atom, the hydrogen atom then being replaced by the alkali metal or alkaline earth metal, such as Li, Na or K, via an ionic bond, and/or an ammonium salt, for example —$NH_2R_1^+X^-$, with X being a halogen, such as chlorine.

The formation of these salts in the medium can be promoted by the presence of a protic solvent, such as water.

Preference is given, as monomers of formula II, to the amino acid, the methyl amino ester or the ammonium hydrochloride of the methyl amino ester. These compounds respectively have the following expanded formulae:

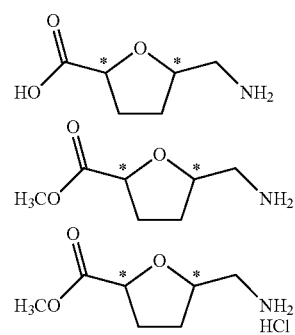

The polyamide according to the invention can be obtained from a single monomer form (II or III) or from a mixture of the forms II and III, optionally in the presence of other comonomers.

Dicarboxylic acid comonomers which can be used according to the invention can, for example, be oxalic acid, malonic acid, succinic acid, glutaric acid, adipic acid, suberic acid, azelaic acid, sebacic acid, 1,12-dodecanedioic acid; 1,3- or 1,4-cyclohexanedicarboxylic acid (cis/trans, or cis or trans); 1,3- or 1,4-phenylenediacetic acid; 1,3- or 1,4-cyclohexanediacetic acid; isophthalic acid; 5-hydroxyisophthalic acid; terephthalic acid; 4,4'-benzophenonedicarboxylic acid; 2,6-naphthalenedicarboxylic acid; 2,5-tetrahydrofurandicarboxylic acid (cis/trans, or cis or trans) and 5-(t-butyl)isophthalic acid, alkali metal (Li, Na or K) salts of 5-sulfoisophthalic acid, and the $C_{36}$ fatty acid dimers known under the Pripol name.

These comonomers are commercially available and can be biobased.

The diamine comonomers can, for example, be chosen from: hexamethylenediamine; 1,4-diaminobutane; 1,5-diaminopentane; 2-methyl-1,5-diaminopentane; 2-methylhexamethylenediamine; 3-methylhexamethylenediamine; 2,5-dimethylhexamethylenediamine; 2,2-dimethylpentamethylenediamine; 1,7-diaminoheptane; 1,8-diaminooctane; 1,9-diaminononanediamine; 2-methyl-1,8-octanediamine; 5-methylnonanediamine; 1,10-diaminodecane; 1,11-diaminoundecane; 1,12-diaminododecane; 2,2,4- and 2,4,4-trimethylhexamethylenediamine; 2,2,7,7-tetramethyloctamethylenediamine; meta-xylylenediamine; para-xylylenediamine; isophoronediamine; 4,4'-diaminodiphenylmethane; 4,4'-methylenebis(cyclohexylamine); $C_2$-$C_{16}$ aliphatic diamines which can be substituted with one or more alkyl groups; the $C_{36}$ diamines originating from fatty acid dimers known under the Priamine name; 2,5-bis(aminomethyl)furan and 2,5-bis(aminomethyl)tetrahydrofuran (cis/trans, or cis or trans); para-phenylenediamine; meta-phenylenediamine; and the ethoxylated diamines known under the Jeffamine or Elastamine name (polyetherdiamine comprising ethylene glycol and/or propylene glycol and/or tetramethylene glycol ethers).

These comonomers are commercially available and can be biobased.

Other lactam or amino acid comonomers (different from the monomers of formula II or III) can be chosen, for example, from caprolactam, 6-aminohexanoic acid, 5-aminopentanoic acid, 7-aminoheptanoic acid, 9-aminononanoic acid, 11-aminoundecanoic acid or dodecanolactam.

These comonomers are commercially available and can be biobased.

Several processes for manufacturing the polyamide according to the invention can be envisaged. These processes can be continuous or batch processes.

The preparation processes can be conventional processes known to persons skilled in the art, in particular the processes for the synthesis of the polyamides of the PA6, PA11 or PA12 type.

The process provided by the present invention is a process for the preparation of the polyamide according to the invention which comprises a polycondensation reaction between at least two identical or different monomers corresponding to the following formula II or to the following formula III:

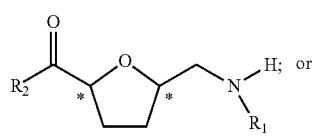
(II)

-continued

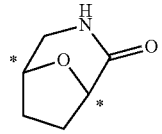
(III)

With
$R_1$ is a hydrogen atom or a group of formula —C(=O)R' with R' being an alkyl group having from 1 to 4 carbon atoms,
$R_2$ is a chlorine atom or a group of formula —OR" with R" being a hydrogen atom or a hydrocarbon group, R" being an alkyl group having from 1 to 4 carbon atoms.

According to a first form, the process is a process for synthesis in solution in a solvent of the polyamide, preferably dimethylacetamide or 1,3-dimethyl-2-imidazolidinone. The synthesis is carried out by a stage of dissolution in the solvent at a temperature chosen between −50° C. and 100° C., preferably between −20° C. and 25° C., followed by a stage of heating the solution comprising the monomer at a temperature ranging from 25° C. to 250° C., preferably from 50° C. to 200° C., and a stage of recovery of the polyamide formed by precipitation from a non-solvent, such as toluene or xylene, or evaporation of the solvent.

The polymerization medium can also comprise additives, such as antifoaming agents, chain limiters (ie. monofunctional molecules capable of reacting with the acid and/or amine functional groups), branching agents (i.e., molecules having at least three functional groups, capable of reacting with the amine and/or acid functional groups, chosen from carboxylic acid and amine groups), catalysts, stabilizers (such as UV, heat or light), mattifying agents (such as $TiO_2$, and the like), lubricants or pigments.

According to a second form, the process is a process for synthesis in aqueous solution of the monomers. The polyamide is obtained by heating, at high temperature and high pressure, an aqueous solution of the monomers (for example a solution in which the monomer of formula II is in the form of an amino acid as described above or an aqueous solution of lactam of formula III) or a liquid comprising the monomers, in order to evaporate the water and/or the liquid while preventing the formation of a solid phase.

The polymerization medium can also comprise additives, such as antifoaming agents, chain limiters (ie. monofunctional molecules capable of reacting with the acid and/or amine functional groups), branching agents (i.e., molecules having at least three functional groups, capable of reacting with the amine and/or acid functional groups, chosen from carboxylic acid and amine groups), catalysts, stabilizers (such as UV, heat or light), mattifying agents (such as $TiO_2$, and the like), lubricants or pigments.

The polycondensation reaction is generally carried out at a pressure of approximately 0.2-5 MPa, preferably 0.5-2.5 MPa, and at a temperature of approximately 100-330° C., preferably 180-300° C. The polycondensation is generally continued in the melt phase at atmospheric or reduced pressure so as to achieve the desired degree of progression.

The polycondensation product is a molten polymer or prepolymer. At this stage, the reaction medium may comprise a vapor phase composed essentially of vapor of the elimination product, in particular water, which may have been formed and/or vaporized.

This product can be subjected to stages of separation of vapor phase and of finishing in order to achieve the desired degree of polycondensation. The separation of the vapor phase can, for example, be carried out in a device of cyclone type for a continuous process. Such devices are known.

The finishing consists in maintaining the polycondensation product in the molten state, at a pressure in the region of atmospheric pressure or under reduced pressure, for a time sufficient to achieve the desired degree of progression. Such an operation is known to a person skilled in the art. The temperature of the finishing stage is advantageously greater than or equal to 180° C. and in all cases greater than the solidification temperature of the polymer. The residence time in the finishing device is preferably greater than or equal to 5 minutes.

The polycondensation product can be washed, in order to extract the oligomers and residual monomers, according to processes known for the washing of polyamide 6 (extraction in liquid phase into water or in gas phase).

The polycondensation product can also be subjected to a post-condensation stage in solid or liquid phase. This stage is known to a person skilled in the art and makes it possible to increase the degree of polycondensation to a desired value.

The polyamide obtained by the process of the invention in molten form can thus be formed directly or can be extruded and granulated, for an optional post-condensation stage and/or for subsequent forming after melting.

A third process for the preparation of the polyamide according to the invention is a "bulk" process, that is to say that the monomers are reacted directly, without addition of solvent or water in a large amount (water can be used in this process in a very small amount in order to initiate the reaction; it does not act as solvent). The reaction is carried out by heating the monomer or monomers and removing the possible condensation product, the final temperature being in all cases chosen so as to have a polymer in a molten state. The pressure can be adjusted throughout the process in order to retain the monomer (under a pressure ranging from atmospheric pressure up to 50 bar) and in order to increase the degree of reaction (pressure less than atmospheric pressure ranging down to 0.01 mbar), according to the conditions defined above.

The polymerization medium can also comprise additives, such as antifoaming agents, chain limiters (ie. monofunctional molecules capable of reacting with the acid and/or amine functional groups), branching agents (i.e., molecules having at least three functional groups, capable of reacting with the amine and/or acid functional groups, chosen from carboxylic acid and amine groups), catalysts, stabilizers (such as UV, heat or light), mattifying agents (such as $TiO_2$, and the like), lubricants or pigments.

Finally, the present invention also provides another process for the preparation of the polyamide according to the invention, referred to as emulsion or suspension process, in which the starting monomers and additives are dispersed in a nonsolvent, such as toluene or xylene, in the form of droplets of controlled size (from a few nanometers to several hundred micrometers), generally by the use of a surfactant. During the polymerization, activated by the addition of a catalyst or by control of the reaction temperature, the monomers are converted to polymer in the droplets. The particles of polymers thus obtained are dispersed in the nonsolvent and can, for example, be recovered by evaporation of the nonsolvent or by filtration.

The polymerization medium can also comprise additives, such as antifoaming agents, chain limiters (ie. monofunctional molecules capable of reacting with the acid and/or amine functional groups), branching agents (i.e., molecules having at least three functional groups, capable of reacting with the amine and/or acid functional groups, chosen from carboxylic acid and amine groups), catalysts, stabilizers (such as UV, heat or light), mattifying agents (such as $TiO_2$, and the like), lubricants or pigments.

The polyamide may be used to produce articles by molding, injection-molding, injection/blow-molding, extrusion/blow-molding, extrusion or spinning. The articles may thus take the form of molded or extruded parts, films, yarns, fibers or filaments.

The articles thus obtained have applications in numerous fields, such as industrial plastics (motor vehicle, E&E, consumer goods), industrial yarns, the textile industry, packaging, and the like.

The present invention also relates to compositions comprising at least the polyamide of the invention and optionally reinforcing fillers and/or various additives.

Such a composition preferentially comprises from 1% to 99%, more preferentially from 40% to 95%, by weight of the polyamide according to the invention, with respect to the total weight of the composition. This composition can in particular comprise other types of polymers, such as in particular thermoplastic polymers.

The composition can additionally comprise reinforcing or bulking fillers. Reinforcing or bulking fillers are fillers conventionally used for the production of polyamide compositions. Mention may in particular be made of reinforcing fibrous fillers, such as glass fibers, carbon fibers or organic fibers, non-fibrous fillers such as particulate or lamellar fillers and/or exfoliable or non-exfoliable nanofillers, for example alumina, carbon black, clays, zirconium phosphate, kaolin, calcium carbonate, copper, diatomaceous earths, graphite, mica, silica, titanium dioxide, zeolites, talc, wollastonite, polymeric fillers, such as, for example, dimethacrylate particles, glass beads or glass powder.

The composition according to the invention can comprise between 5% and 60% by weight of reinforcing or bulking fillers and preferentially between 10% and 40% by weight, with respect to the total weight of the composition.

The composition according to the invention comprising the polyamide as defined above can comprise at least one impact modifier, that is to say a compound capable of modifying the impact strength of a polyamide composition. These impact modifiers preferentially comprise functional groups which react with the polyamide. According to the invention, the term "functional groups which react with the polyamide" is understood to mean groups capable of reacting or of interacting chemically with the acid or amine functional groups of the polyamide, in particular by covalency, ionic or hydrogen bond interaction or van der Waals bonding. Such reactive groups make it possible to ensure good dispersing of the impact modifiers in the polyamide matrix. Good dispersing is generally obtained with impact modifier particles having a mean size of between 0.1 and 2 μm in the matrix.

The composition according to the invention can additionally comprise additives usually used in the manufacture of polyamide compositions. Thus, mention may be made of lubricants, flame retardants, light and/or heat stabilizers, plasticizers, nucleating agents, UV stabilizers, catalysts, antioxidants, antistatic agents, dyes, mattifying agents, molding additives or other conventional additives.

These fillers and additives can be added to the modified polyamide by normal means suited to each filler or additive, such as, for example, during the polymerization or in the melt blending. The polyamide compositions are generally obtained by blending the various compounds participating in the composition under cold conditions or in the melt. The process is carried out at more or less high temperature and at more or less high shear force, according to the nature of the various compounds. The compounds can be introduced simultaneously or successively. Use is generally made of an extrusion device in which the material is heated, then melted and subjected to a shear force, and conveyed.

It is possible to blend all the compounds in the molten phase during a single operation, for example during an extrusion operation. It is possible, for example, to blend granules of the polymer materials, to introduce them into the extrusion device in order to melt them and to subject them to more or less high shearing. According to specific embodiments, it is possible to preblend some of the compounds, in the melt or not in the melt, before preparation of the final composition.

The composition according to the invention, when it is prepared using an extrusion device, is preferably conditioned in the form of granules. The granules are intended to be formed using processes involving melting in order to obtain articles. The articles are thus composed of the composition. According to a normal embodiment, the modified polyamide is extruded in the form of rods, for example in a twin-screw extrusion device, which are then chopped into granules. The parts are subsequently prepared by melting the granules produced above and feeding the molten composition into forming devices, for example injection-molding devices.

The composition according to the invention makes possible the preparation of articles obtained by forming said composition, for example by extrusion, in particular extrusion of plaques, sheets or films, molding, in particular injection-molding, rotational molding or blow-molding, in particular injection/blow-molding, or spinning. Mention may be made, as articles, of those used in the motor vehicle industry or the electronics and electrical industry, for example.

The articles obtained can in particular be molded, blow-molded or extruded parts, yarns, fibers, filaments or films.

The polyamide according to the invention exhibits numerous advantages. First of all, it is advantageously at least partly biobased, which makes it possible to reduce its environmental footprint. It also exhibits very advantageous mechanical properties and a high molar mass and it may be semi-crystalline. Finally, the polyamide of the invention can replace the polyamides conventionally used in fields such as industrial plastics (motor vehicle, E&E, consumer goods), industrial yarns, the textile industry, packaging, and the like. In addition, it exhibits a hydrophilic nature which renders its application particularly advantageous in the field of textiles.

The process of the invention itself also exhibits numerous advantages, including the production of polyamides of high molar masses by the use of monomers intrinsically having a stoichiometric amount of reactive functional groups. In particular, the process does not generate decomposition products, such as furan, which is a highly toxic product. In addition, the preparation of the polyamide according to the invention can be carried out using industrial equipment normally used in factories for the manufacture of polyamides of the type of those obtained from amino acids or lactams, in particular polyamide 6, and thus does not require additional industrial investment.

Other details or advantages of the invention will become more clearly apparent in the light of the examples given below.

EXAMPLES

Reaction scheme for the synthesis of the compound methyl 5-(aminomethyl)tetrahydrofuran-2-carboxylate hydrochloride

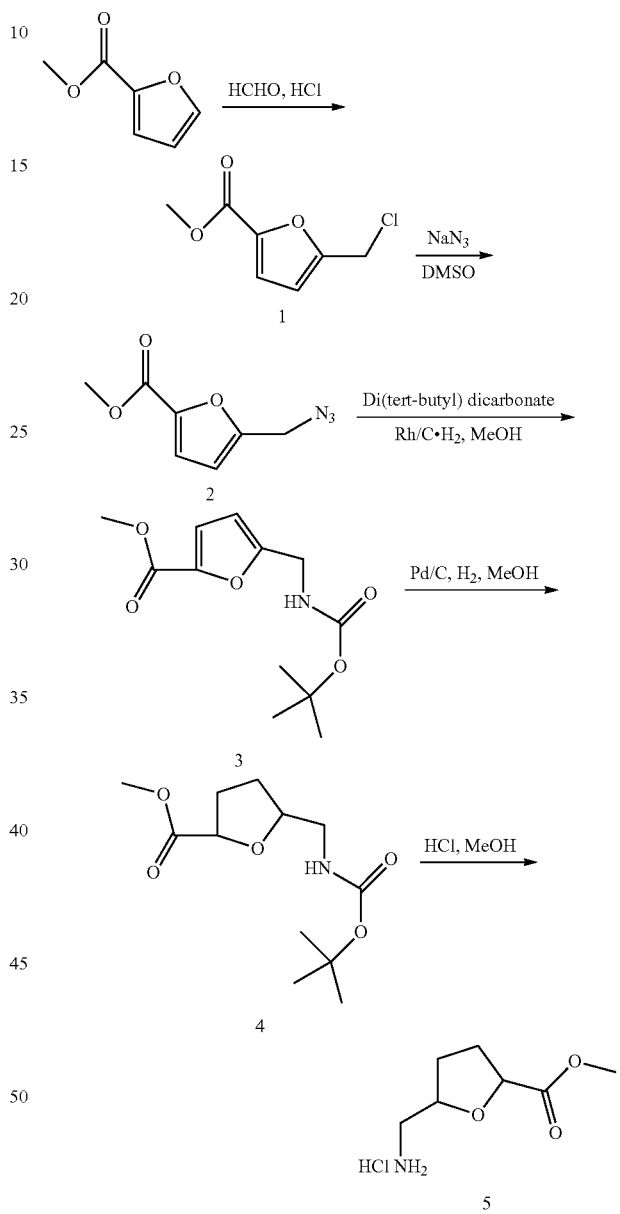

Preparation of methyl 5-(aminomethyl)tetrahydrofuran-2-carboxylate hydrochloride Stage 1. Preparation of methyl 5-(chloromethyl)furan-2-carboxylate 1

Anhydrous zinc chloride (18.74 g, 0.1375 mol) and paraformaldehyde (16.31 g, 0.715 mol) are added to a solution of methyl 2-furoate (63.05 g, 0.5 mol) in dichloromethane (250 ml).

The mixture is heated to 35° C. and gaseous anhydrous hydrochloric acid is bubbled into the reaction mixture for 2.5 h. The reaction mixture is subsequently poured into cold water (250 ml) and the organic phase is separated by settling. The aqueous phase is extracted with dichloromethane (2×50 ml) and the organic phases are collected and washed with water (2×50 ml) and then dried with potassium carbonate. The solvent is evaporated on a rotary evaporator and the residual oil is distilled under reduced pressure (20 Pa).

62.7 g of desired product, in the form of a yellow solid, are thus obtained with a yield of 71.8% and a purity by LC/MS of greater than 98%.

$^1$H NMR (400 MHz, CDCl$_3$): d=7.13 (d, J=3.6 Hz, 1 H), 6.49 (d, J=3.6 Hz, 1 H), 4.59 (s, 2 H), 3.90 (s, 3 H).

MS: (M+H m/z=175.1)

Stage 2. Preparation of methyl 5-(azidomethyl)furan-2-carboxylate 2

A solution of the product from stage 1 (34.8 g, 0.2 mol, 1.0 eq) and of sodium azide (NaN$_3$) (20.0 g, 0.3 mol, 1.5 eq) in DMSO (200 ml) is heated at 50° C. for 16 h. The reaction mixture is poured onto ice-cold water (1000 ml) and extracted with petroleum ether (2×500 ml), and the combined extracts are then dried and concentrated under vacuum. The azide product is obtained in the form of a yellow oil (36.0 g, yield 99%, purity 96%) and is used in the following stage without other purification.

$^1$H NMR (400 MHz, CDCl$_3$): d=7.15 (d, J=3.2 Hz, 1 H), 6.46 (d, J=3.2 Hz, 1 H), 4.38 (s, 2 H), 3.90 (s, 3 H).

MS: (M+H m/z=182.1)

Stage 3. Preparation of methyl 5-((tert-butoxycarbonylamino)methyl)furan-2-carboxylate 3

A mixture of the crude product from stage 2 (25.0 g, 0.138 mol), di(tert-butyl)dicarbonate (27.0 g, 0.124 mol) and Rh/C (5%, 1 g) in methanol (250 ml) is introduced into a 500 ml Parr autoclave. The reactor is placed under hydrogen pressure (5 atm) at ambient temperature (~20° C.) for 36 h. The reaction mixture is filtered through celite and the filtrate is concentrated under vacuum in order to obtain a yellow oil. The crude product is purified by chromatography on a silica column using a petroleum ether/ethyl acetate (5/1) mixture. A colorless oil is then obtained (24.0 g, yield 68%, purity >97%).

$^1$H NMR (400 MHz, CDCl$_3$): d=7.06 (d, J=3.6 Hz, 1 H), 6.31 (d, J=2.8 Hz, 1 H), 5.10 (s, 1 H), 4.31 (d, J=4.8 Hz, 2 H), 3.84 (s, 3 H), 1.40 (s, 9 H).

MS: (M+H m/z=256.1)

Stage 4. Preparation of methyl 5-((tert-butoxycarbonylamino)methyl)tetrahydrofuran-2-carboxylate 4

The product from stage 3 (24.0 g, 94.1 mmol), palladium-on-charcoal (10% w/w, 2.5 g) and methanol (250 ml) are introduced into a 500 ml autoclave. The mixture is placed under hydrogen pressure (10 atm) at 30° C. for 16 h. The reaction mixture is filtered through celite and the filtrate is concentrated under vacuum. A colorless oil is obtained (20.0 g, yield 82%, purity >97%).

MS: (M+Na m/z=282.1)

Stage 5. Preparation of methyl 5-(aminomethyl)tetrahydrofuran-2-carboxylate hydrochloride 5

The product obtained in stage 4 (20.0 g, 77.2 mmol) is dissolved in methanol (150 ml) and gaseous hydrochloric acid is bubbled into the solution for 4 h. The mixture is concentrated under vacuum in order to obtain a colorless oil (14.0 g, yield 93%, purity >98%).

$^1$H NMR (400 MHz, CD$_3$OD): d=4.63 (dd, J=8.8, 4.3 Hz, 1 H), 4.36-4.33 (m, 1 H), 3.78 (s, 3 H), 3.21-3.17 (m, 1 H), 3.10-3.07 (m, 1 H), 2.44-2.39 (m, 1 H), 2.18-2.12 (m, 2 H), 1.79-1.76 (m, 1 H)

MS: (M+H m/z=160.1)

Preparation of the polyamide based on methyl 5-(aminomethyl)tetrahydrofuran-2-carboxylate hydrochloride 5

2 grams of the monomer 5 in the oily form are placed in a glass tube at atmospheric pressure flushed with a nitrogen headspace, without stirring. It is subsequently immersed in a metal bath regulated at 40° C. and gradually heated as far as 200° C., over 2 hours. Boiling is displayed as soon as the glass tube is placed in the bath at 40° C. The viscosity of the medium increases during the heating of the reaction medium. When the temperature reaches 200° C., the glass tube is removed from the bath and cooled as far as ambient temperature, still while flushing with nitrogen. The polyamide formed is transparent and soft.

The thermal transitions of the polyamide are determined by differential scanning calorimetry (DSC), using a Perkin Elmer Pyris 1 device, at a rate of 10° C./min. It exhibits a Tg of 18° C.

Preparation of Copolyamide PA 6/THF

In a reactor adapted for the synthesis of polyamide 6 are introduced 75.09 g (0.664 mol) of caprolactam, 6.90 g (0.048 mol) of 5-(aminomethyl)tetrahydrofuran-2-carboxylic acid (prepared by hydrolysis of methyl 5-(aminomethyl) tetrahydrofuran-2-carboxylate hydrochloride), 36.35 g of water and 1 g of an anti-foaming agent.

The reaction mixture is polymerized according to a process dedicated to the synthesis of PA6: the reaction mixture is heated under atmospheric pressure to concentrate the monomers in water up to 70 wt.-% by evaporation of water, then the reactor is closed and heated so that the reaction mixture temperature reaches 250° C. (during the heating, the pressure increases up to 17.5 bar and is being regulated at this pressure: removal of water occurs during the regulation of the pressure), then a depressurization of the reactor up to atmospheric pressure is launched while keeping the heating of the reaction mixture up to 260° C., then the reaction mixture is maintained at atmospheric pressure and 260° C. for one hour, then the copolyamide melt is extruded in the shape of strand, cooled in an iced water bath and pelletized. The pellets obtained are washed to remove the oligomers according to the following process: 3 times 2 hours in water at 90° C. After drying, the pellets are analyzed by DSC at 10° C./min.

The copolyamide exhibits a melting temperature Tm=213° C., crystallization temperature Tc=171° C. and glass transition temperature Tg=59° C. (measured at 40° C./min). We observe that the introduction of THF moieties in PA6 decreases both the melting temperature and crystallization temperature of pure PA6 prepared according to the same process (Tm=221° C., Tc=178° C.), which confirms we synthesized a copolyamide.

We also observed that this copolymer exhibits higher moisture absorption than pure PA6. We placed 10 g of pellets of PA6/THF into water at 23° C. and measured the water absorption of the pellets after different times such as t=24 h, t=48 h: water absorption(t)=(m(t)−m(t=0))/m(t=0). The same experiment was performed with the pellets of pure PA6. It appears that PA6/THF pellets absorb 16.6% water at t=24 h and 17.4% at t=48 h. For PA6 pellets, the water absorption is equal to 6.3% at 24 h and 9.5% at t=48 h. according to the Table as follows:

| Polymers | Water absorbtion at t = 24 h | Water absorbtion at t = 48 h |
|---|---|---|
| PA6/THF pellets | 16.6% | 17.4% |
| PA6 pellets | 6.3% | 9.5% |

We conclude that PA6 modified by only 6.7 mol.-% of THF units increases dramatically the water absorption. It is useful in textile application to improve the comfort of PA 6 or PA 66 fibers by absorbing more moisture.

What is claimed is:

1. A polyamide comprising the repeat unit of following formula I:

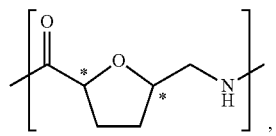
(I)

wherein the symbol * denotes an asymmetric carbon, and wherein the polyamide is a copolymer comprising other repeat units different from the unit of formula I, said repeat units different from the unit of formula I resulting from comonomers.

2. The polyamide according to claim 1, wherein the copolymer comprises 0.5 to 10 mol % of repeat unit of formula I, calculated on the total amount of monomers introduced for the preparation of the copolymer.

3. The polyamide according to claim 1, wherein the copolymer is selected from the group consisting of: PA THF/6, PA THF/11, PA THF/12, PA THF/66, and PA THF/66/6.

4. A process for the preparation of the polyamide according to claim 1, the process comprising a polycondensation reaction between at least two identical or different monomers corresponding to the following formula II, or salt thereof, or to the following formula III:

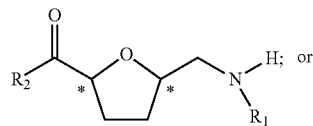
(II)

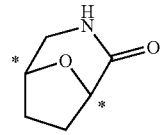
(III)

$R_1$ is a hydrogen atom or a group of formula —C(=O)R' with R' being an alkyl group having from 1 to 4 carbon atoms, $R_2$ is a chlorine atom or a group of formula —OR" with R" being a hydrogen atom or a hydrocarbon group;

in the presence of other comonomers.

5. The process according to claim 4, wherein $R_1$ is a hydrogen atom and $R_2$ is an —OR" group with R" being a hydrogen atom.

6. The process according to claim 4, $R_1$ is a hydrogen atom and $R_2$ is an —OR" group with R" being a linear or branched alkyl group comprising from 1 to 4 carbon atoms.

7. The process according to claim 6, wherein R" is selected from the group consisting of methyl, ethyl, propyl, isopropyl, butyl and isobutyl.

8. The process according to claim 4, wherein at least one of the monomers of formula II or III is biobased according to the standard ASTM 06866.

9. The process according to claim 4, wherein at least one of the monomers of formula II is in the form of a salt.

10. A process for the preparation of articles, the process selected from the group consisting of molding, injection molding, blow-molding, extruding and spinning the polyamide according to claim 1.

11. An article obtained from the polyamide according to claim 1, said article being selected from the group consisting of a molded part, extruded part, yarn, fiber, filament, and film.

12. A composition comprising at least the polyamide according to claim 1 and optionally a reinforcing filler and/or an additive.

13. The polyamide according to claim 1, wherein the comonomers are selected from the group consisting of dicarboxylic acids, diamines, amino acids, amino esters and lactams.

14. The process according to claim 4, wherein R" is an alkyl group having from 1 to 4 carbon atoms.

* * * * *